Nov. 5, 1946.  A. JOB  2,410,738
COMBER
Filed March 11, 1942   15 Sheets-Sheet 2
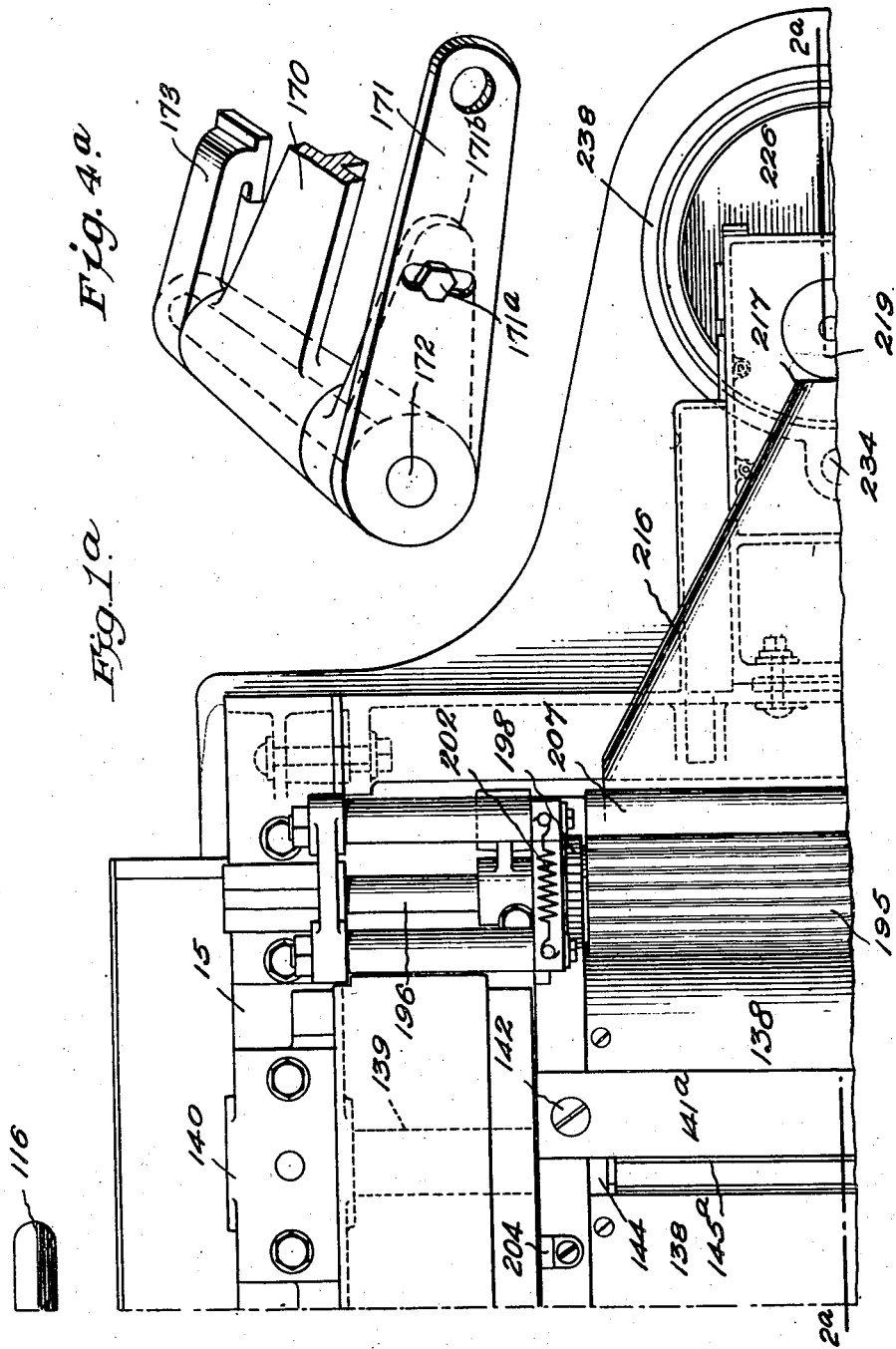
INVENTOR.
ARTHUR JOB
BY
ATTORNEY.

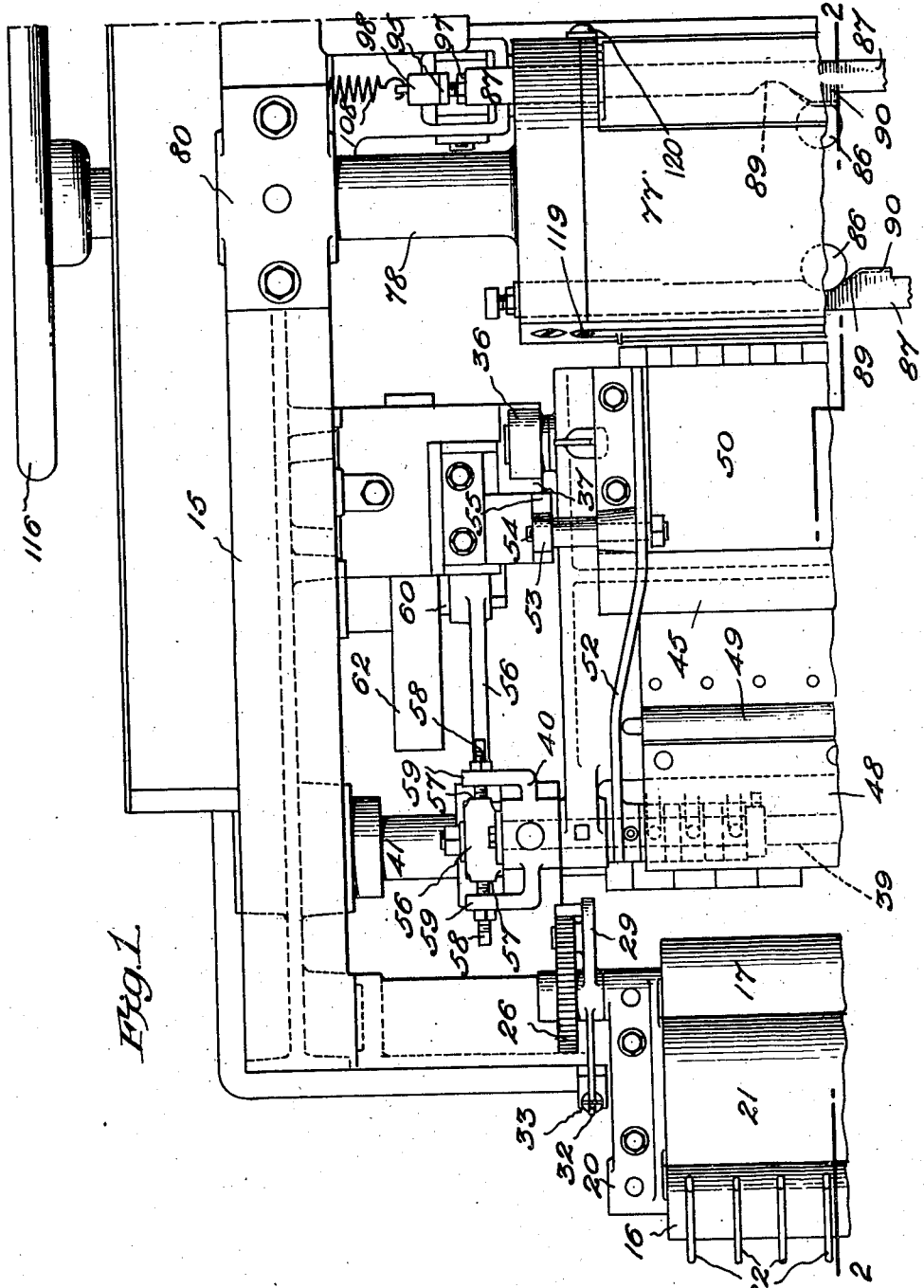

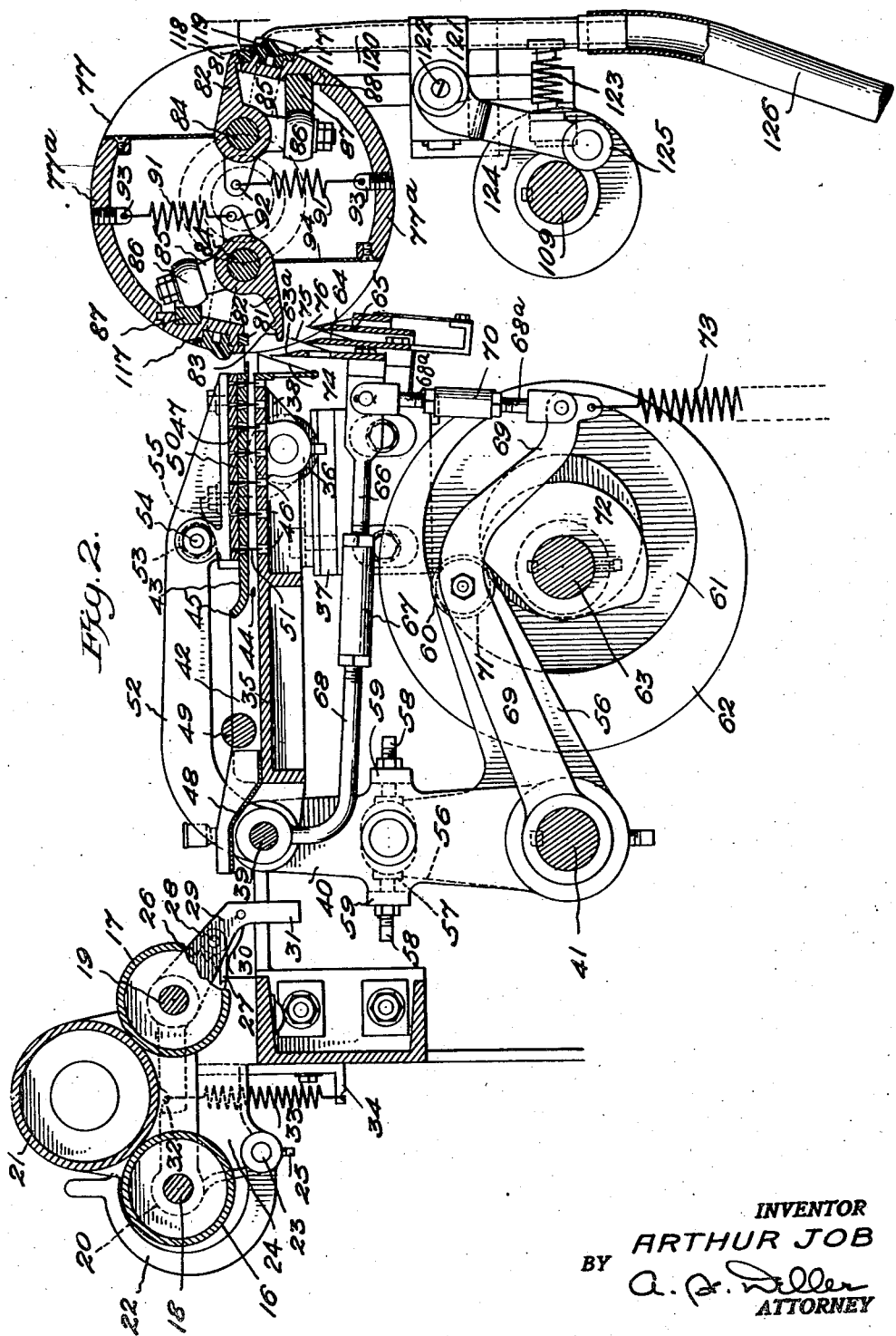

Nov. 5, 1946.    A. JOB    2,410,738
COMBER
Filed March 11, 1942    15 Sheets-Sheet 4
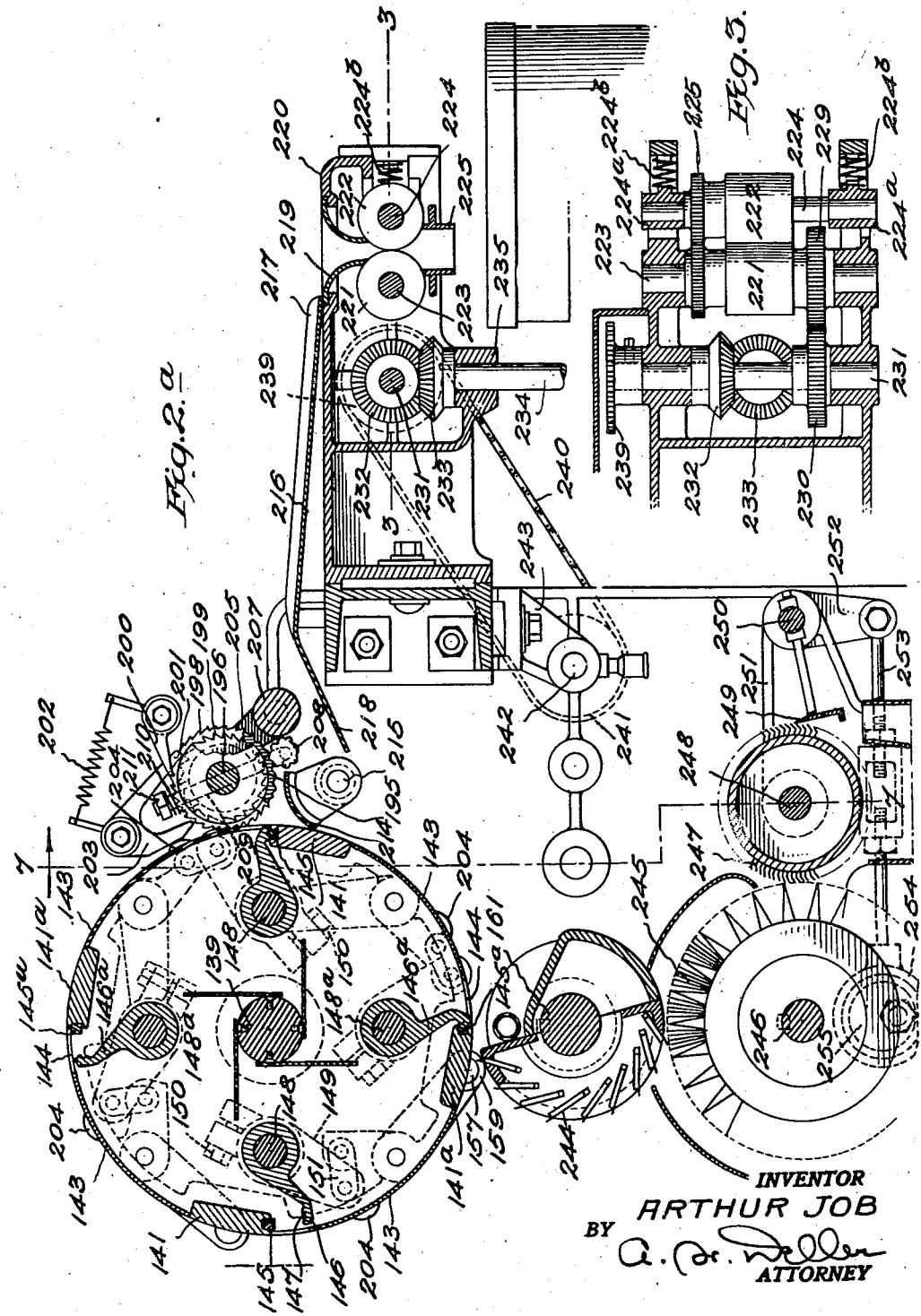
INVENTOR
ARTHUR JOB
BY
ATTORNEY

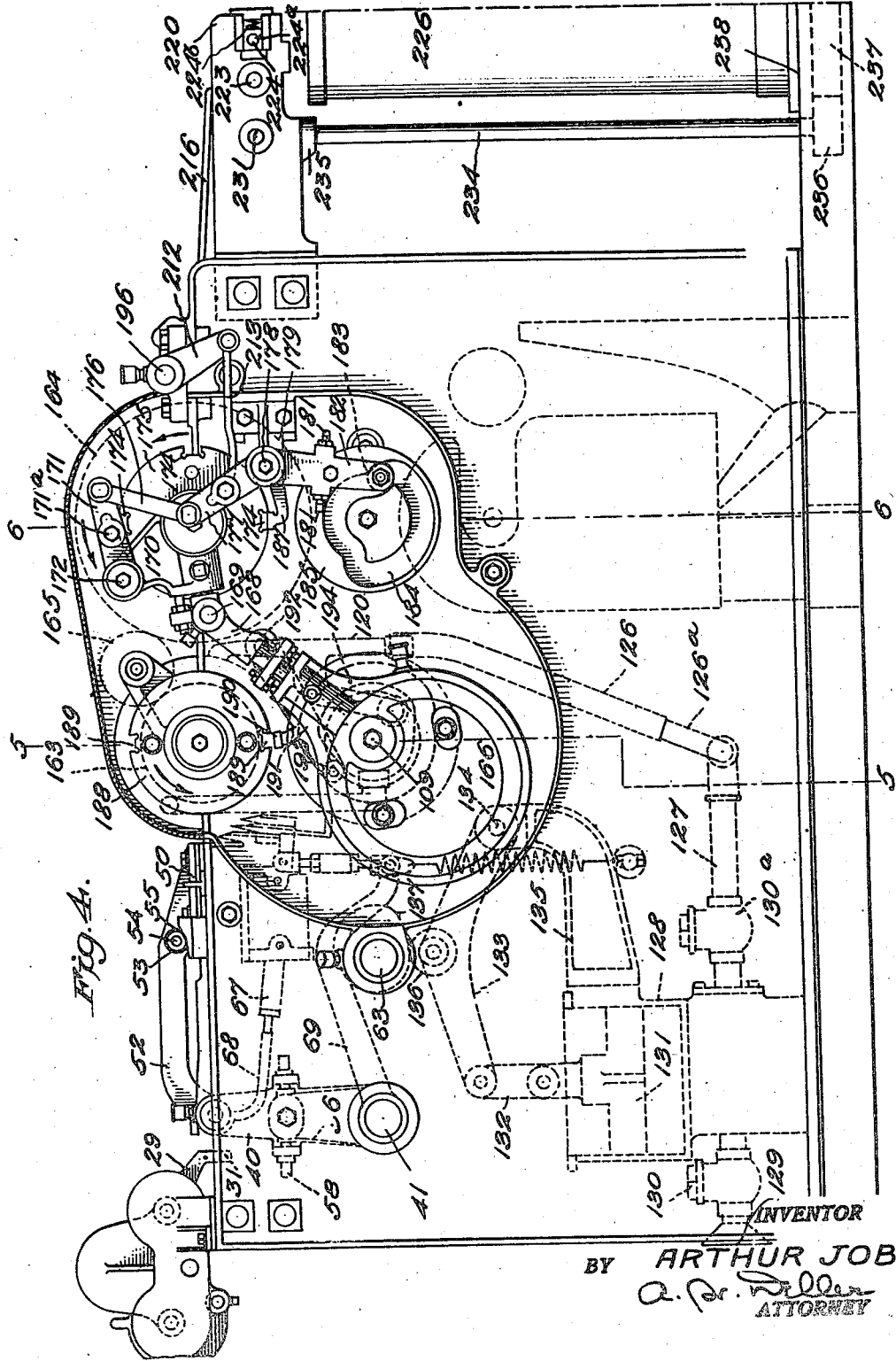

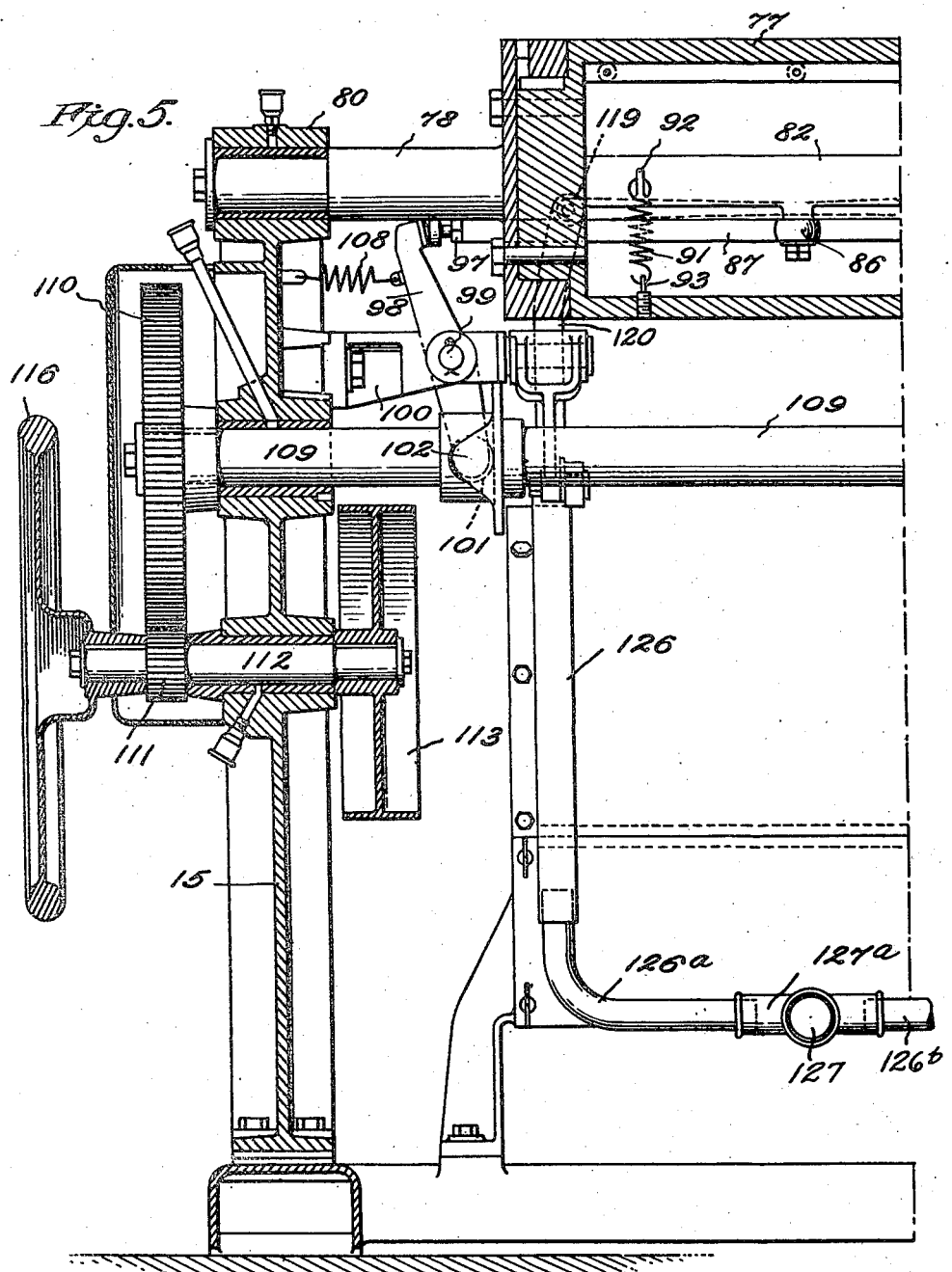

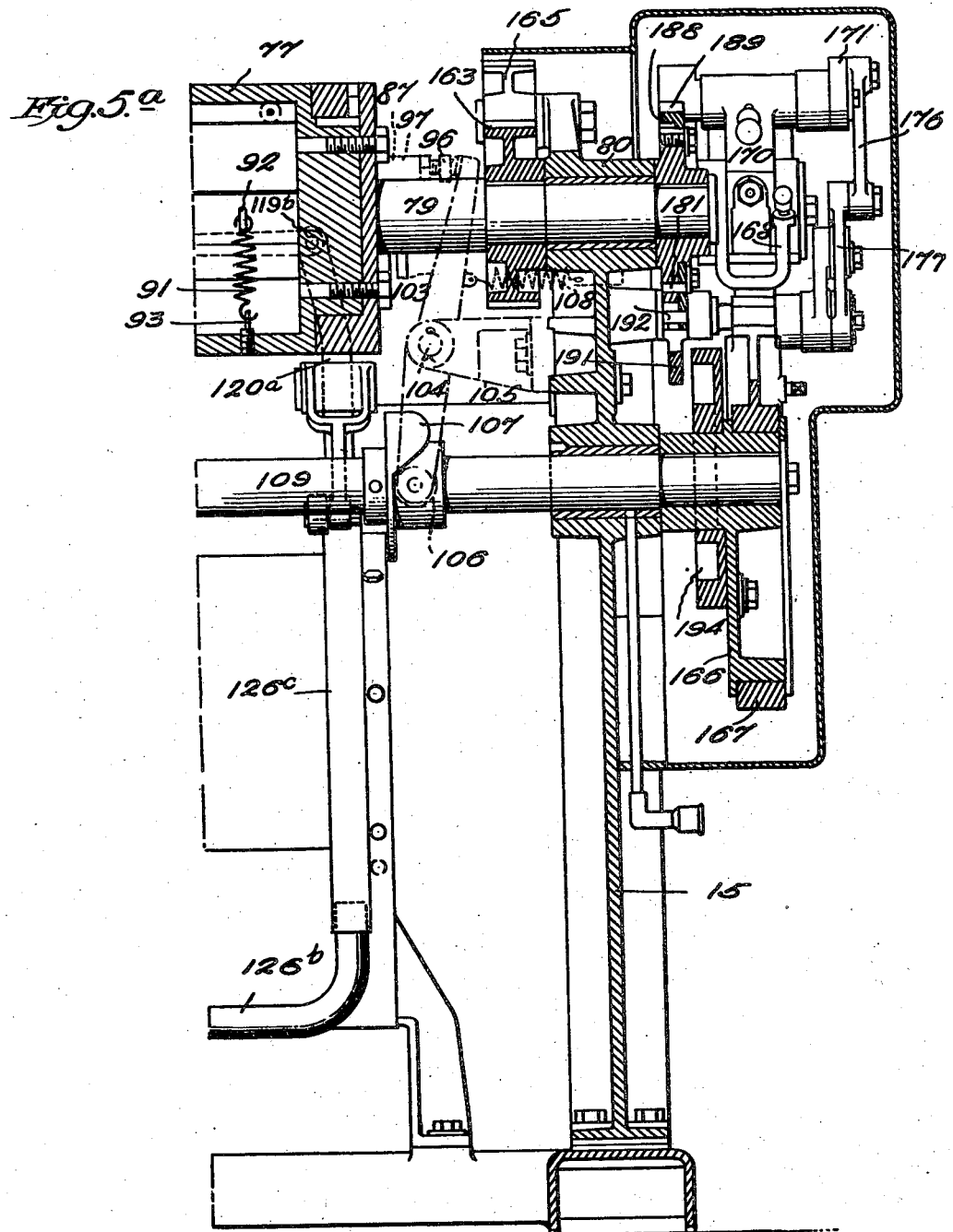

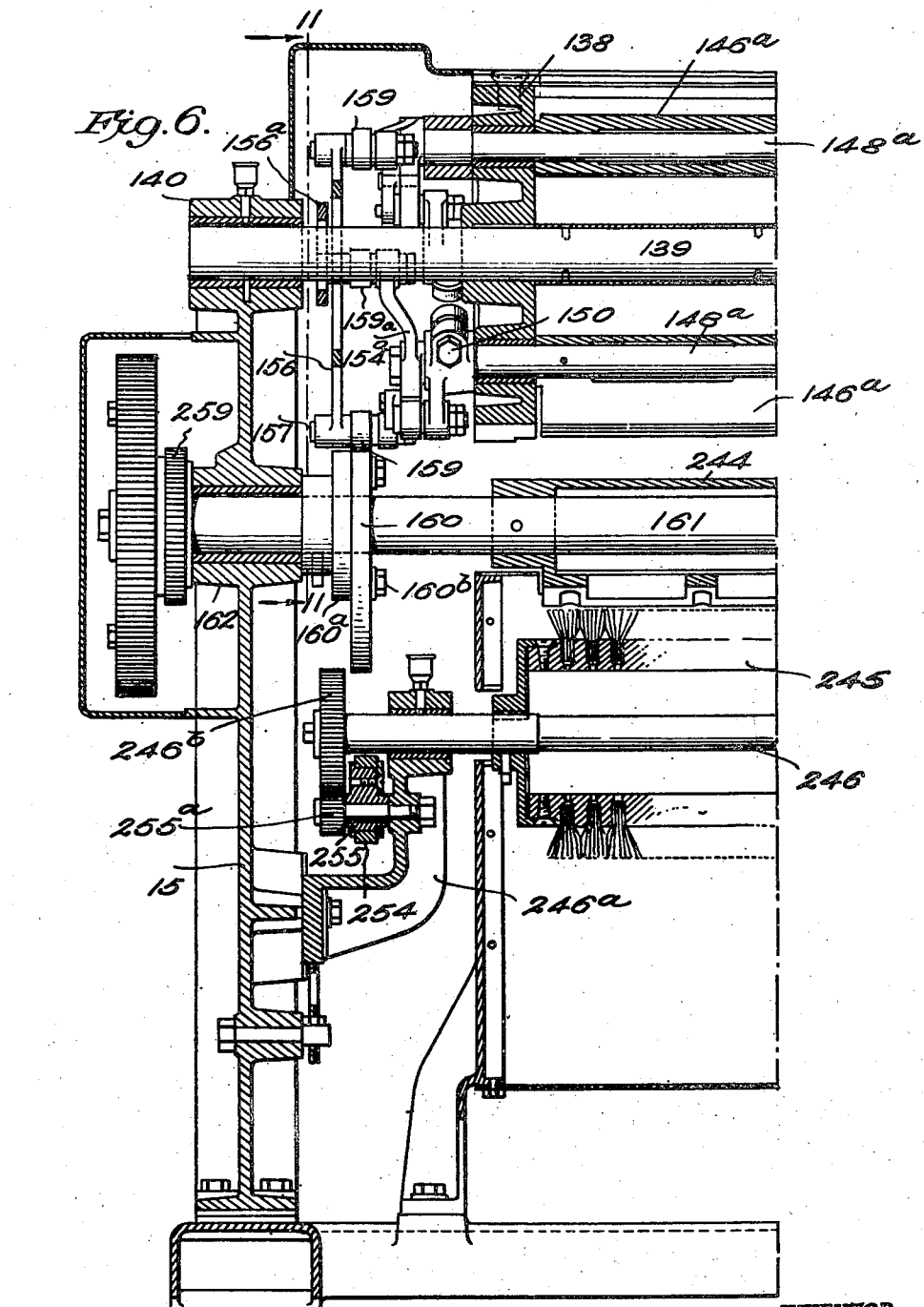

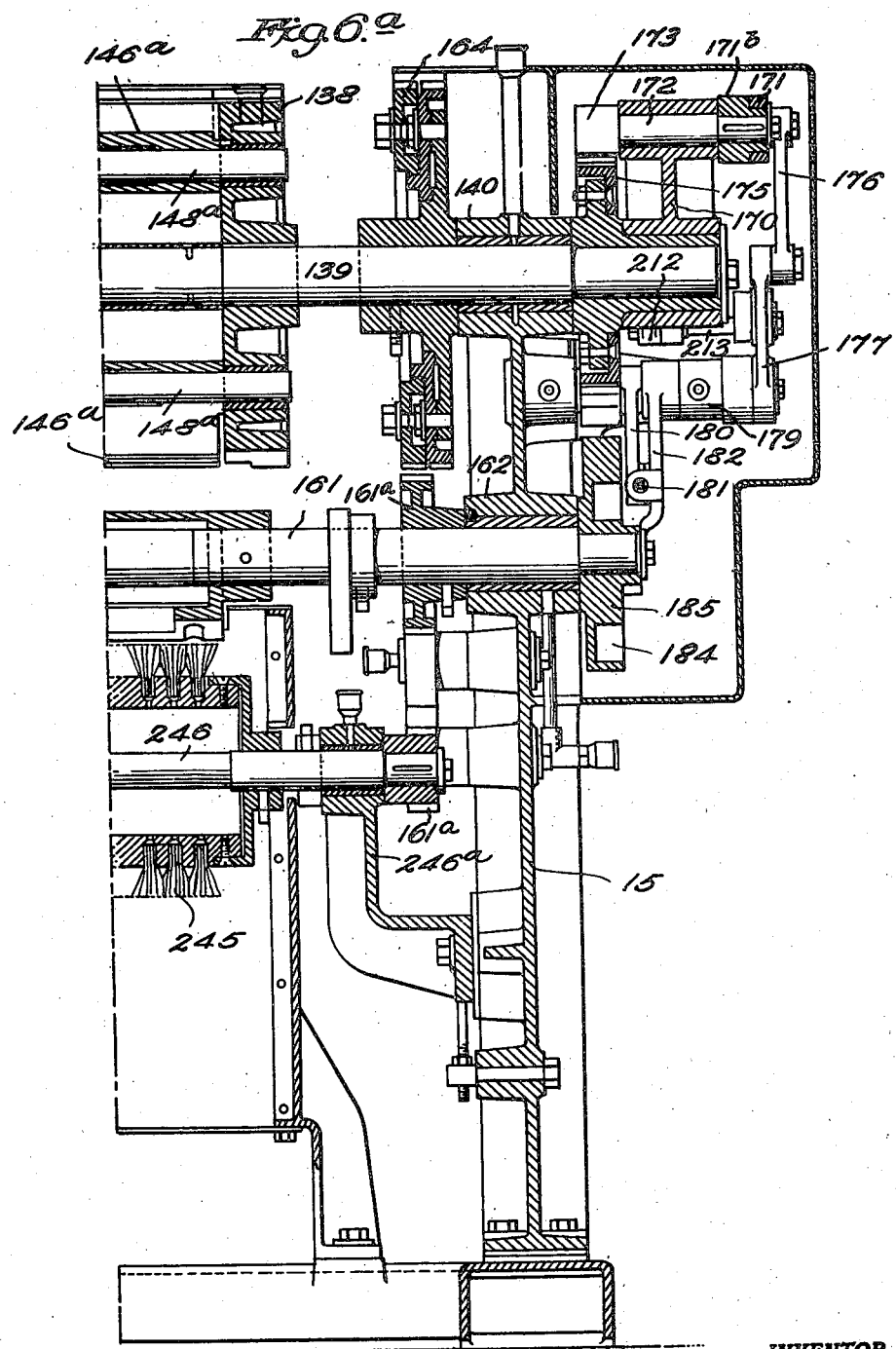

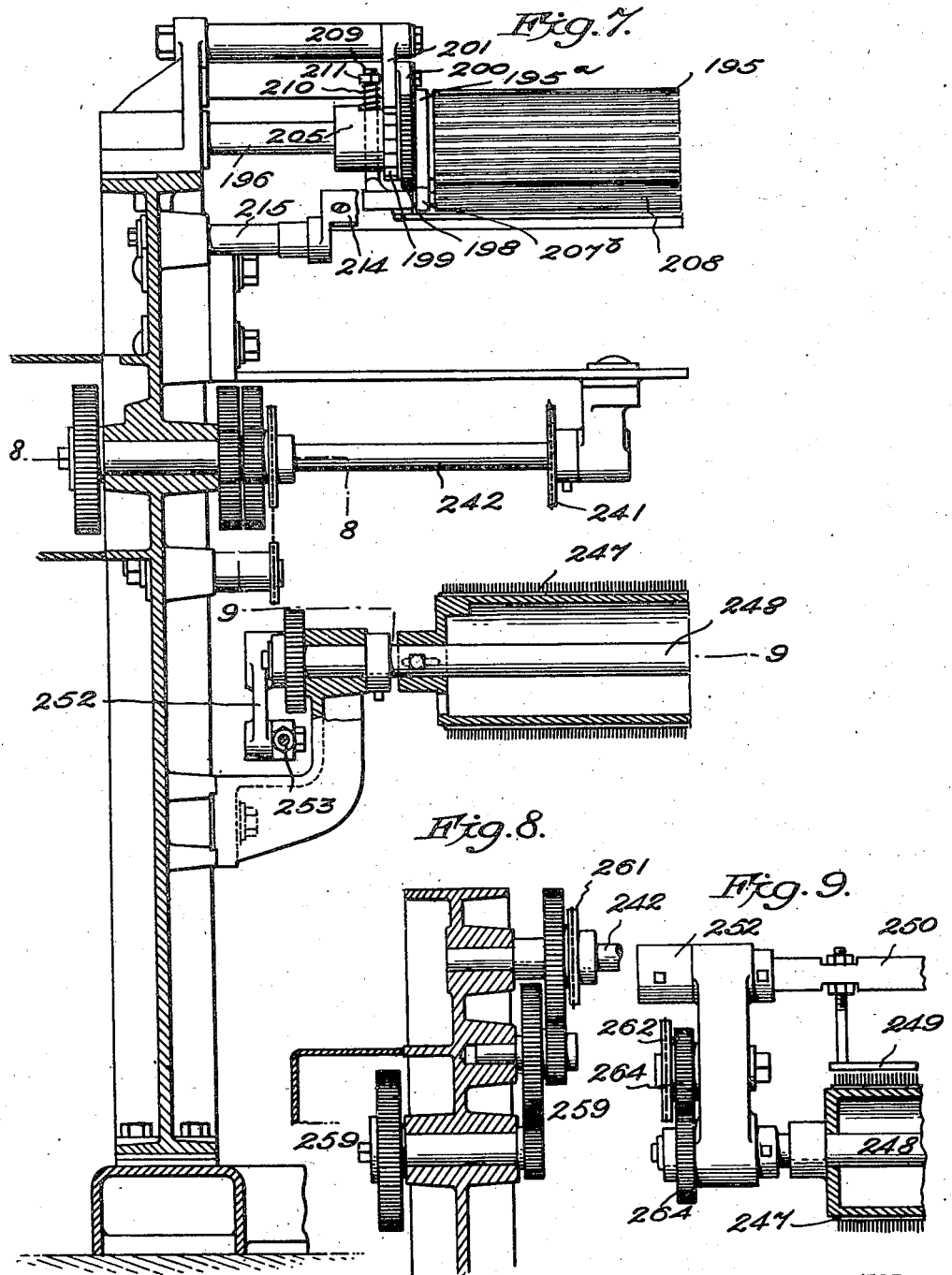

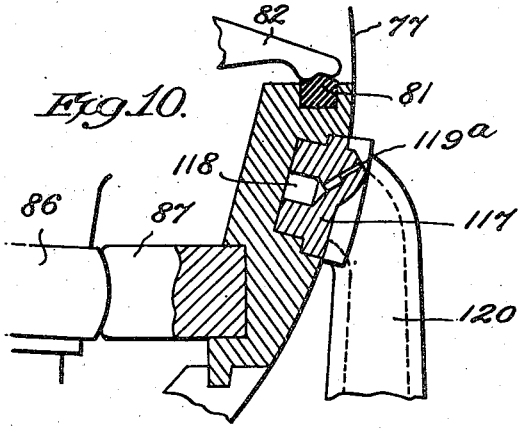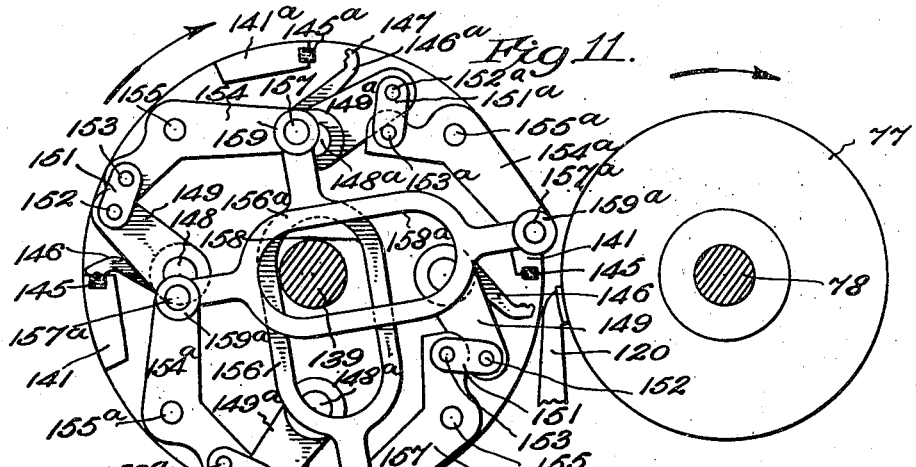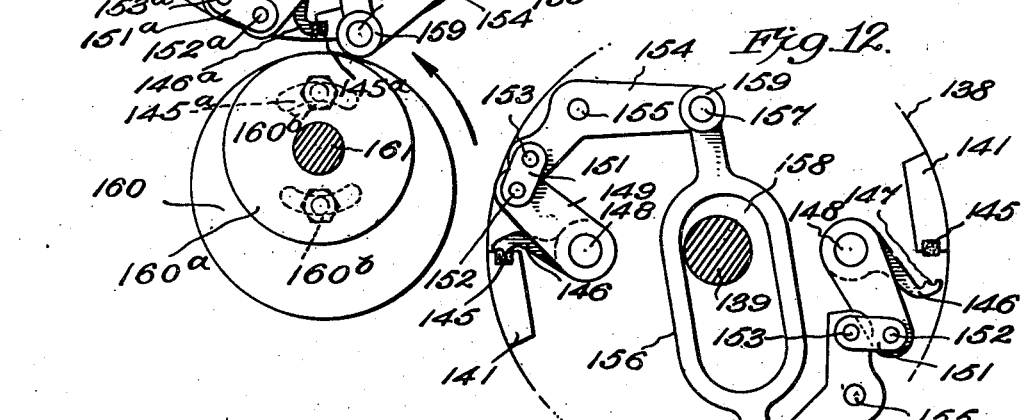

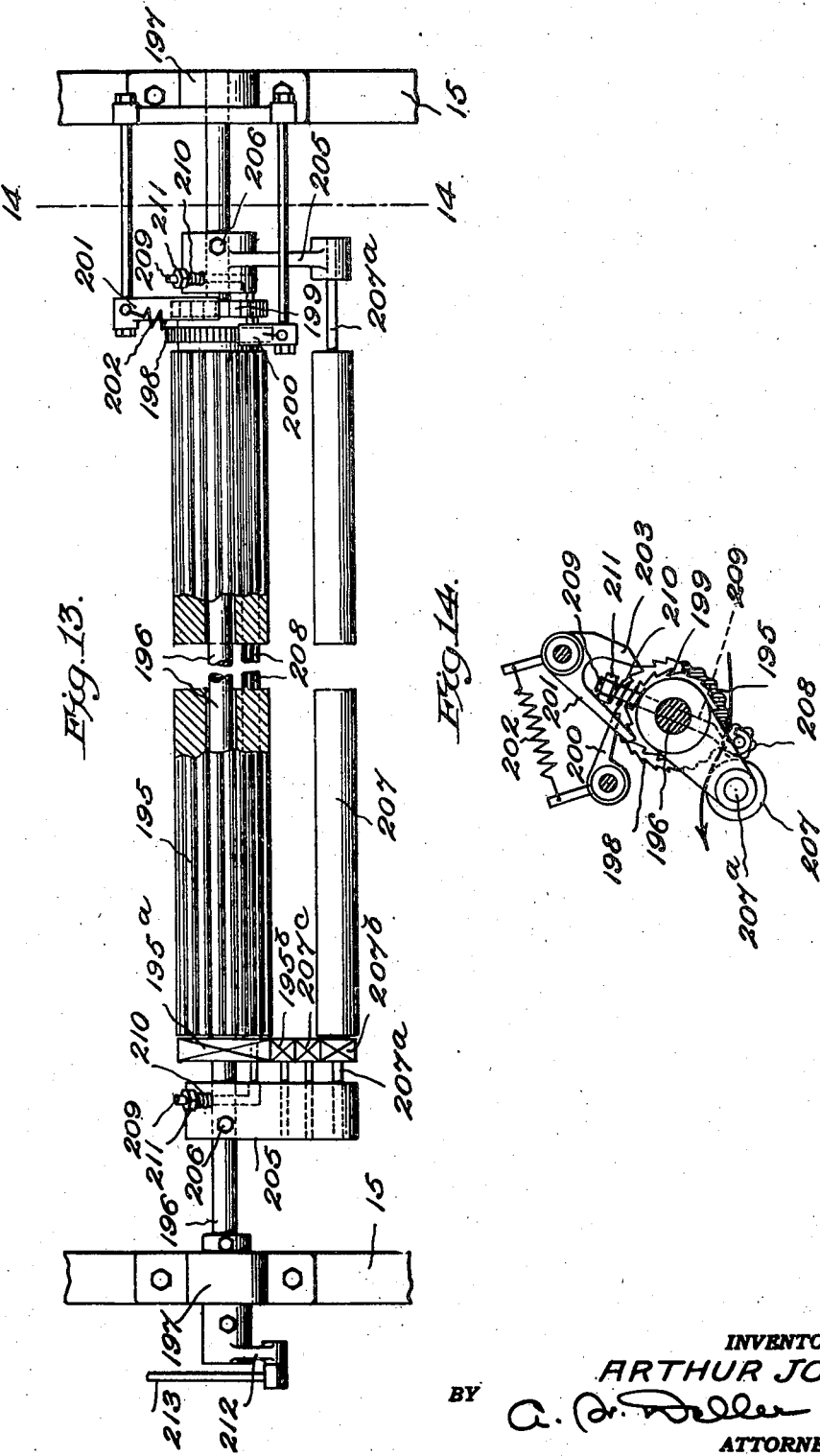

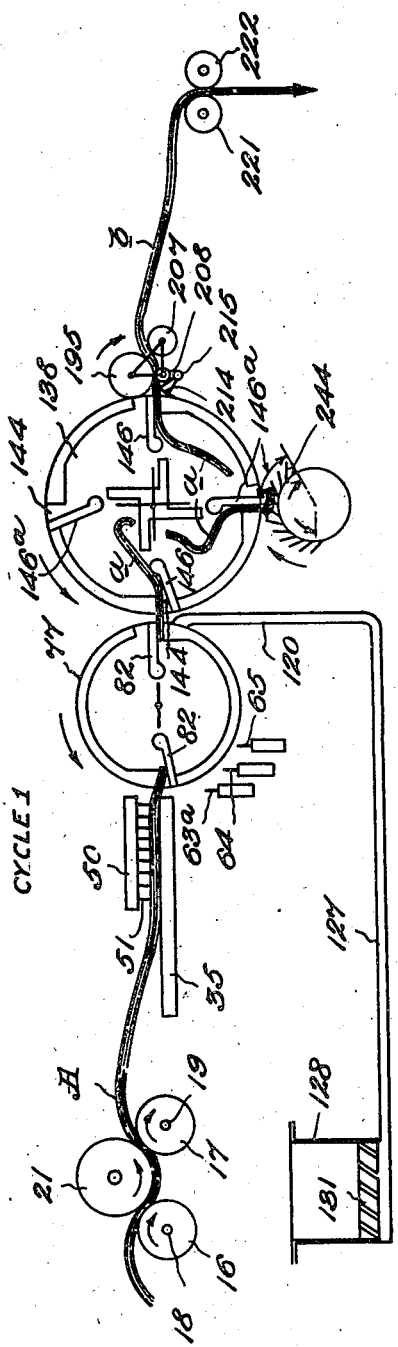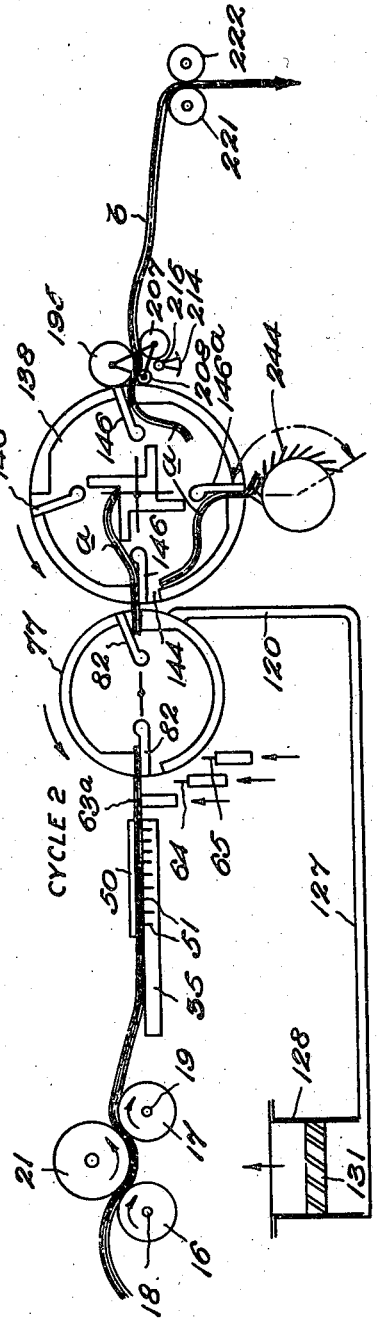

Nov. 5, 1946.                A. JOB                 2,410,738
                             COMBER
                       Filed March 11, 1942        15 Sheets-Sheet 14
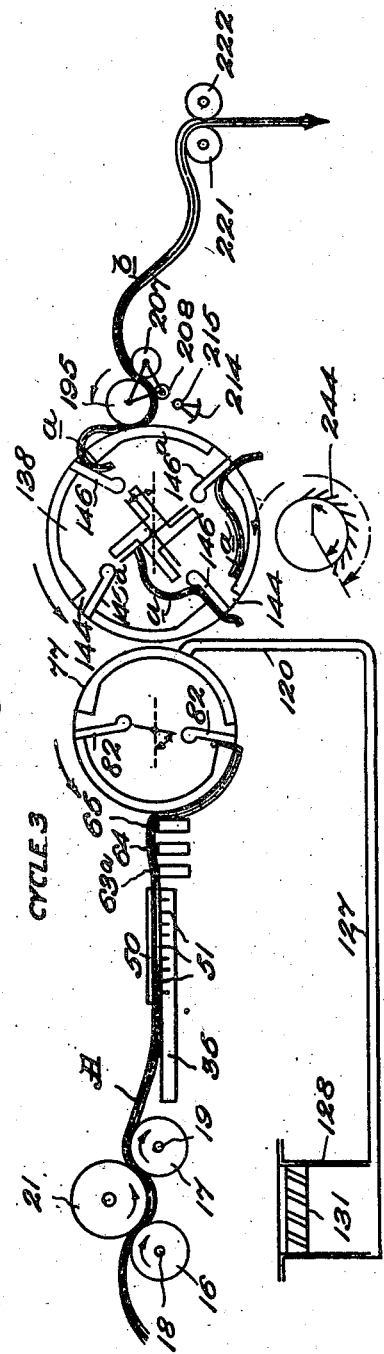
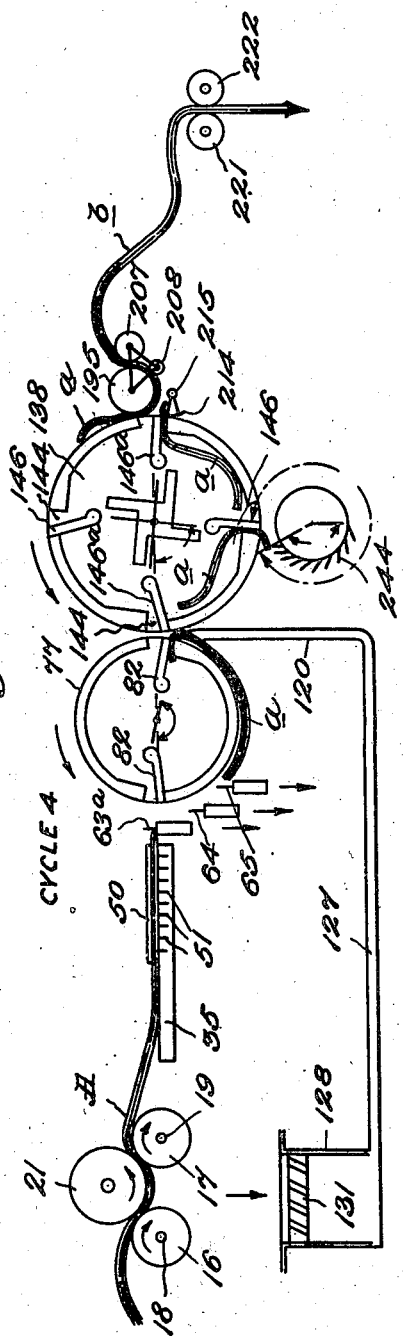
INVENTOR.
ARTHUR JOB
BY
ATTORNEY.

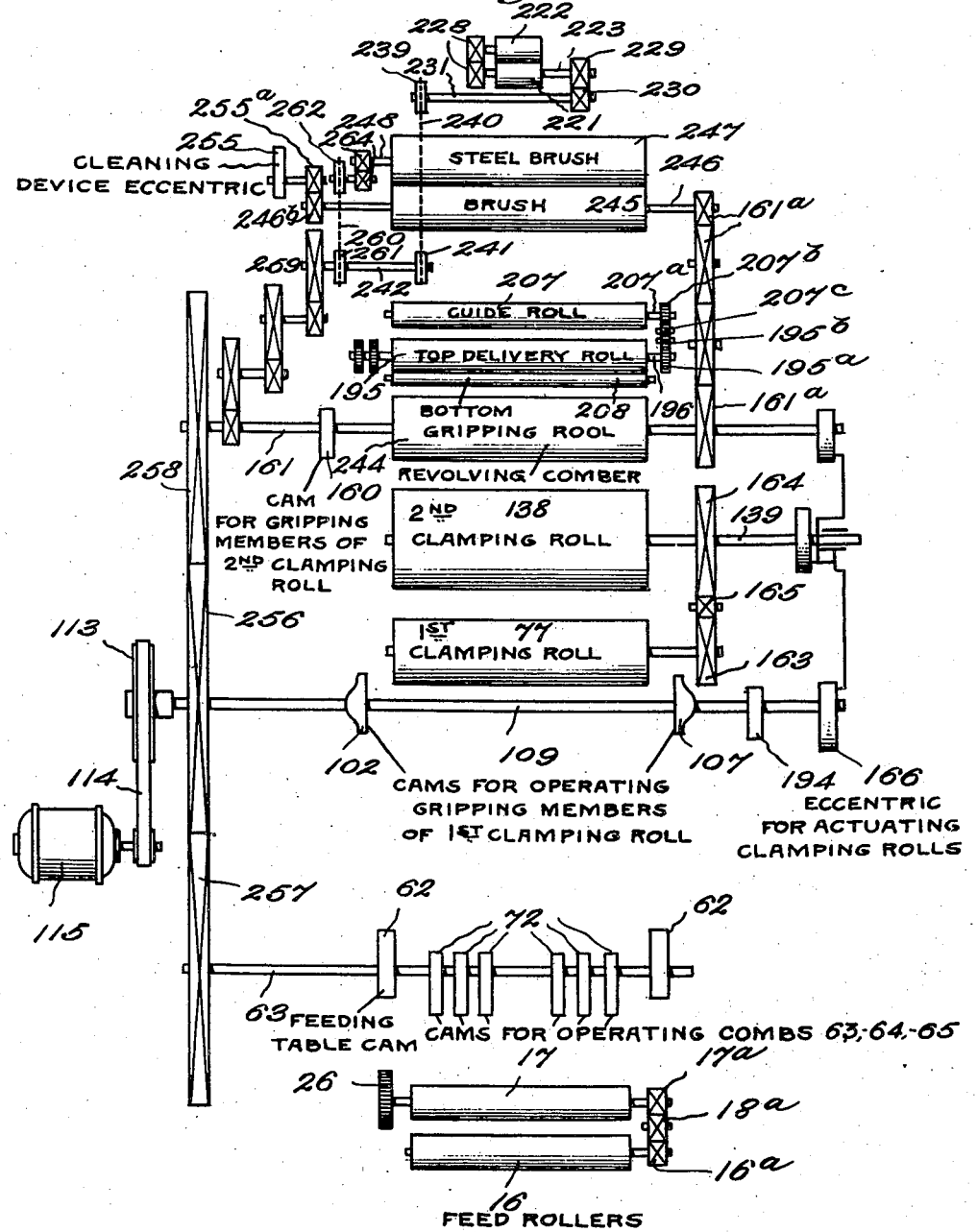

Patented Nov. 5, 1946

2,410,738

UNITED STATES PATENT OFFICE 2,410,738

COMBER

Arthur Job, Providence, R. I., assignor to Sils Corporation, a corporation of Delaware Application March 11, 1942, Serial No. 434,245

7 Claims. (Cl. 19—117)

The invention relates to combers and more particularly to machines for combing textile fibers and more especially medium length fibers of various kinds such as wool, flax, hemp, silk-waste, etc.

The invention has for its object the provision of a novel machine of the indicated class which is efficient in operation without requiring any particularly skilled supervision and whereby the fibers are treated in a manner to produce a continuous and uniform fibrous sliver whereby successive steps in the production of linen and other yarns are materially facilitated.

Other objects will appear from the description hereinafter and the features of novelty will be pointed out in the claims.

In the accompanying drawings which illustrate an example of the invention without defining its limits, Figs. 1 and 1ª together constitute a fragmentary plan view of the novel comber;

Figs. 2 and 2ª together show the machine in sectional elevation substantially on the lines 2—2 and 2ª—2ª of Figs. 1 and 1ª respectively;

Fig. 3 is a fragmentary horizontal section on the line 3—3 of Fig. 2ª;

Fig. 4 is a side elevation partly in section, of the novel comber;

Fig. 4ª is a fragmentary perspective view on an enlarged scale;

Figs. 5 and 5ª together show the comber in vertical section substantially on the line 5—5 of Fig. 4;

Figs. 6 and 6ª similarly illustrated the machine in vertical section substantially on the line 6—6 of Fig. 4;

Fig. 7 is a vertical section on the line 7—7 of Fig. 2ª;

Fig. 8 is a detail horizontal section on the line 8—8 of Fig. 7;

Fig. 9 is a detail horizontal section on the line 9—9 of Fig. 7;

Fig. 10 is an enlarged detail section on air blast device included in the machine;

Fig. 11 is a detail section on the line 11—11 of Fig. 6;

Fig. 12 is a diagrammatic view of a portion of the mechanism shown in Fig. 11;

Fig. 13 is a schematic detail plan view of delivery rolls forming part of the machine;

Fig. 14 is a sectional view on the line 14—14 of Fig. 13;

Figs. 15, 16, 17, and 18 are diagrammatic views showing four cycles in the operation of the machine in successive stages, and Fig. 19 is a diagrammatic view illustrating the gearing of the machine.

The novel comber comprises a supporting frame 15 of suitable type and dimensions on which the mechanical elements of the machine are mounted. At its inlet end the comber is provided with feeding mechanism comprising initial feeding means whereby the fibers which previously may have been passed through a conventional drawing frame, are initially fed into the machine, for instance, in the form of fibrous slivers, said feeding means, in the illustrated example, being intermittently operated in a manner and for the purpose to be more fully set forth hereinafter.

In the form shown in the drawings, the aforesaid initial feeding means comprises feed rollers 16 and 17 preferably located at a common level in spaced, parallel relation and respectively fixed upon shafts 18 and 19 rotatably mounted in bearing brackets 20 forming part of or secured to the frame 15. The rollers 16 and 17 are geared together by suitable gears 16ª and 17ª located on the shafts 18 and 19 and an idler gear 18ª suitably mounted between and in mesh with the gears 16ª and 17ª on said shafts 18 and 19. A cooperating feed roller 21 may be located above and between the rollers 16 and 17 preferably in tangential surface engagement therewith as shown in Fig. 2. The cooperating feed roller 21 may be rotatably mounted in place in any convenient manner as by being journalled in said bearing brackets 20. The feeding means further may include a plurality of separators 22 extending about the circumferential surface of the roller 16 in spaced parallel relation and carried by a supporting bar 23 mounted on brackets 24 forming part of or secured to the frame 15. The separators 22 are preferably adjustable at will lengthwise of the roller 16 and bar 23 and are fixed in adjusted positions on the latter in any suitable manner as by means of set screws 25.

The fibers, instead of being fed as above set forth, may be fed in the form of a ribbon from a roll thereof, in which case the feed roller 21 will be replaced by the roll of fiber ribbon supported upon the feed rollers 16 and 17 in rolling contact therewith.

The feed rollers 16 and 17 may be intermittently rotated in any sutiable manner to rotate the feed roller 21 or the aforesaid roll of ribbon fiber in proper timing with the associated elements of the machine to secure the desired results. For instance, as shown in Fig. 2 of the drawings, a ratchet wheel 26 is fixed upon the shaft 19 and is actuated in successive steps by means of a pawl 27 pivotally mounted at 28 on a bell-crank lever 29, a spring 30 carried by the latter serving to yieldingly maintain said pawl 27 in operative engagement with the ratchet wheel 26. The lever 29 is loosely mounted on the shaft 19 so as to be capable of being rocked thereon and includes as a part of its one arm a depending member 31 whereby the lever 29 is operatively actuated in the manner to be more fully described hereinafter. The other arm of the lever 29 is provided with a notch 32 or its equivalent for the accommodation of one end of a coil spring 33, the other end of which is secured to a projection 34 suitably fixed on the frame 15. The spring 33 serves to operate the lever 29 in a return direction subsequent to each operative actuation thereof to cause the pawl 27 to travel in a return direction relatively to the ratchet wheel 26 in a movement of recovery preparatory to the next feeding step.

The aforesaid feeding mechanism further comprises secondary feeding means which, in cooperation with the aforesaid initial feeding means, controls the advancing or feeding of the fibers in the machine.

In its illustrated form, the secondary feeding means consists of a feeding table 35 supported at its forward edge by means of rollers 36 on horizontal tracks 37 suitably mounted on the frame 15, said rollers 36 being journalled on brackets 38 depending from the table 35 as shown in Fig. 2. The rear edge of the feeding table 35 is pivotally connected with a rod 39 supported by upright levers 40 loosely mounted on a shaft 41 capable of rocking on its axis in conventional bearings on the frame 15. The table 35 is provided with upright side flanges 42 which are integral parts of a plate 43 located above and in spaced relation to the table 35 at the forward portion thereof to form a passage 44 terminating at the forward edge of said table 35 as illustrated in Fig. 2; the passage 44 preferably is formed with a flaring inlet end for instance, by curving the rear edge of the plate 43 upwardly as shown at 45. For the purpose to be more fully set forth hereinafter, the table is provided with a plurality of apertures 46 which register with corresponding apertures 47 extending through the plate 43. In addition to the parts described above, the feeding table 35 carries a guide chute 48 which projects beyond the rear edge of said table 35 and extends over and beyond the rod 39 in a direction toward the initial feeding means and has its exit edge in delivery proximity to a rod 49 supported by the flanges 42 at a slight distance above the table 35, as shown in Fig. 2.

The secondary feeding means further includes holding means whereby the fibers are periodically connected with the feeding table 35 to move therewith as will appear more fully hereinafter.

The holding means illustrated in the drawings comprises a holding plate 50 provided with a plurality of pins 51 depending from said plate 50 and preferably corresponding in number to the apertures 46 and 47 of the table 35 and plate 43 respectively. In its operative position the holding plate 50 rests upon the plate 43 with the pins 51 projecting through the apertures 47 thereof and into the apertures 46 of the feeding table 35, as illustrated in Fig. 2. The holding plate 50 is carried by arms 52 loosely mounted on the rod 39 for pivotal movement thereon, and provided at intermedaite points with rollers 53 rotatably mounted on pins 54 projecting outwardly from the side faces of the arms 52 as shown in Fig. 1.

Upwardly inclined cams or projections 55 are fixed upon suitable portions of the frame 15 and are located in the paths of the respective rollers 53 as the latter participate in the operative reciprocation of the table 35 and its associated elements. With this arrangement the rollers 53 by riding up on the cams or projections 55 will swing the arms 52 on the rod 39 to thereby lift the holding plate 50 away from the plate 43 and raise the pins 47 sufficiently to remove the ends of the latter from the apertures 46 to a point above the passage 44 for the purpose to be referred to more specifically hereinafter.

In the operation of the machine, the upright levers 40 are pivotally rocked on the shaft 41 by suitable operating means to reciprocate the feeding table 35 and its associated elements in proper operative synchronism with the other parts of the comber.

In the illustrated example, the aforesaid operating means comprises bell-crank levers 56, the upright arms of which are provided with bearing faces 57 engaged by set screws 58 adjustably mounted on lugs 59 forming part of and projecting laterally from the levers 40 in spaced pairs at intermediate points thereof, as illustrated in Figs. 1 and 2. The other arms of said bell-crank levers 56 are provided at their free ends with laterally projecting rollers 60 extending into the cam grooves 61 of cams 62 fixed upon a shaft 63 suitably journalled in the frame 15 of the machine.

It will be noted, as illustrated in Fig. 2, that the depending member 31 of the ratchet operating lever 29, is located in the path of reciprocation of the feeding table 35 so as to be engaged thereby as said table 35 is operated in a direction toward the feed rollers 16, 17 and 21. With this arrangement the lever 29 will be pivotally actuated by said table 35 in a direction to cause the pawl 27 to act on the ratchet 26 and thereby operate the feed rollers 16, 17 and 21 in a feeding step once during each complete reciprocation of the feeding table 35 and its associated elements.

In addition to the parts so far described, the novel comber includes a plurality of combs 63ª, 64 and 65 arranged in predetermined groups and successively adjusted to operative position in cooperative relation with the feeding table 35 in suitable timing with the operation thereof.

The combs 63ª, 64 and 65 in the example shown in the drawings, are carried by rods 66 in screw threaded connection with turn-buckles 67 which in turn are threaded upon companion rods 68 pivotally mounted on the rod 39 for rocking movements thereon, so that said combs 63ª, 64 and 65 partake of the reciprocating movements of the feeding table 35 and its associated elements and at the same time are capable of being pivotally adjustable relatively thereto.

Any suitable mechanism may be provided for adjusting the combs 63ª, 64 and 65 to and from their operative positions in the desired sequence. For instance, as shown in the drawings, each rod 66 may be connected by means of a link 68ª with a lever 69 loosely mounted on the shaft 41 for pivotal movement thereon. The links 68ª may be adjustable as to length, for instance, by being made in sections operatively connected with turn-buckles 70 as illustrated in Fig. 2. The levers 69 are pivotally rocked on the shaft 41 by means of rollers 71 suitably mounted on said levers 69 and arranged in rolling engagement with cams 72 fixed upon the shaft 63. Springs 73 connected with and acting on the levers 69 serve to maintain the rollers 71 in operative contact with the associated cams 72. The latter are relatively positioned on the shaft 63 so as to operate the respective levers 69 and the respective combs 63ª, 64, and 65 in the desired sequence as will appear more fully hereinafter.

In order to provide for the automatic cleaning of the combs 63ª, 64 and 65, a resilient cleaning member 74 is mounted on the table 35 at the forward edge thereof, and corresponding resilient cleaning members 75 and 76 are fixed upon combs 63ª and 64 respectively. These cleaning members 74, 75, and 76 are engaged by the respective combs 63ª, 64, and 65 in their return movements from their operative positions, the action of the cleaning members being such as to remove any fibers or other material previously gathered by said combs.

As shown in Fig. 2 a hollow clamping roll 77 is located in operative relation to the feeding table 35 and its associated elements and is provided at it opposite ends with trunnions 78 and 79 respectively, whereby said roll 77 is rotatably journalled in suitable bearings 80 forming part of the frame 15. For convenience of description and because of its functions, which will appear more fully hereinafter, the roll 77 may be termed the first clamping roll of the machine.

The periphery of the roll 77 is interrupted to provide peripheral openings formed by two duplicate and diametrically opposed sections 77ª each provided along one longitudinal edge with a gripping member or gasket 81 which may be of any suitable material and fixed in place in any convenient manner. Gripping or clamping members 82 are located within said roll 77 for cooperation with the gripping members or gaskets 81 and preferably are grooved at their free ends as indicated at 83. The gripping or clamping members 82 are secured upon rock shafts 84 suitably mounted in the roll 77 and operatively controlled by any suitable means so as to adjust the grooved ends 83 of said members 82 into and out of gripping or clamping relation with the gripping members or gaskets 81. For instance, as shown in Fig. 2, arms 85 may project radially outwardly from the rock shafts 84 or from the gripping members 82 thereon and carry rollers 86 at their free ends. The rollers 86 are in rolling engagement with cam slides 87 mounted in guide grooves 88 formed in the sections 77ª of the roll 77. The cam slides 87 are reciprocable in the guide grooves 88 and are provided with cam recesses 89 and continuing cam projections 90 which in cooperation with the rollers 86 serve to rock the shafts 84 and thereby operate the gripping or clamping members 82 relatively to the gripping members or gaskets 81 in the intended manner.

Springs 91 are connected at one end with lugs 92 extending from the rock shafts 84 or from the clamping or gripping members 82, and at their other ends with projections 93 which, as shown in Fig. 2, may be threaded into the sections 77ª of the roll 77; in any case, the springs 91 exert a tension tending to rock the gripping or clamping members 82 to inoperative positions away from the members or gaskets 81. Plates 94 may be fastened to the sections 77ª of the roll 77 and extend inwardly therefrom to constitute protecting covers within said roll to prevent fibers and other foreign matter from passing into said roll 77.

The cam slides 87 extend outwardly beyond the roll 77 at opposite ends thereof and preferably are provided with adjustable abutments 95 and 96 for instance in the form of headed screws fixed in adjusted positions by lock nuts 97. As the roll 77 is operated, the abutment 95 of a given cam slide 87 will come to rest in registry with an operating lever 98 pivoted at 99 upon a bracket 100 fixed upon the frame 15. The lever 98 carries a roller 101 arranged to be acted on by a cam 102 in a manner to rock said lever 98 and thereby develop a pushing force on the abutment 95 to force the cam slide 87 toward the right in Figs. 5 and 5ª. As the operation of the roll 77 is resumed, the abutment 96 of said given cam slide 87 will come to rest in registry with a return operating lever 103 pivoted at 104 on a bracket 105 suitably mounted on the frame 15 as shown in Fig. 5ª. The lever 103 carries a roller 106 which is acted on by a cam 107 in a manner to rock said lever 103 and thereby develop a pushing force on the abutment 96 to force the cam slide 87 in a return direction toward the left in Figs. 5 and 5ª. In this way the gripping or clamping members 82 are adjusted into and out of gripping relation with gripping members or gaskets 81 as will appear more fully hereinafter. Springs 108 act on the respective levers 98 and 103 to maintain the rollers 101 and 106 in operative rolling contact with the cams 102 and 107 respectively. The cams 102 and 107 are secured upon a shaft 109 rotatably mounted in the frame 15 and operated in proper operative timing by means of a gear 110 fixed on the shaft 109 and meshing with a pinion 111. The latter is carried by a counter shaft 112 journalled in the frame 15 and driven for instance by means of a pulley 113 connected by means of a belt 114 with an electric or other motor 115. The counter shaft 112 may further carry a hand wheel 116 for manually actuating the same if for any reason this should be necessary or desirable.

In contiguous cooperative relation with the gripping members or gaskets 81 and preferably beneath the same, the roll 77 is provided with surface grooves in which nozzle members 117 are fitted and secured in any convenient manner so as to lie in surface registry with the peripheral surface of the roll 77 and the sections 77ª thereof. The members 117 extend throughout the major portion of the roll 77 along the length thereof and are provided with continuous interior air channels 118 which likewise extend throughout the major length of the roll 77 and have inlet passages 119 and 119ᵇ communicating therewith at the opposite ends of said channels 118 and terminating in the peripheral surfaces of the roll 77 at predetermined points thereof as shown in Fig. 1; it will be understood that at its opposite ends the peripheral surface of the roll 77 is continuous and that the inlet passages 119 are outwardly open in said continuous peripheral portions of said roll 77 as indicated in Figs. 1, 5 and 5ª. The members 117 are further provided with air nozzles 119ª located in preferably thickened portions thereof at spaced intervals between the inlet passages 119, and inclined in directions toward the gripping members or gaskets 81 with the exit ends of said nozzles open exteriorly of the roll 77 or specifically of the nozzle member 117 as shown in Fig. 10. In the operative rotation of the roll 77 the aforesaid inlet passages are arranged to register with the exit opening of air pipes 120 which ride upon and snugly fit the continuous surface portions of the roll 77. With this arrangement the inlet passages of each member 117 accordingly establish communication between each air channel 118 and the interior of air pipes 120 at predetermined stages in the operation of the machine for the purpose to be more fully set forth hereinafter. The air pipes 120 and 120ª are located near each end of the roll 77 and are carried by brackets 121 pivoted at 122 upon suitable portions of the frame 15 and are influenced by springs 123 bearing against the pipes 120 and 120ª and against arms 124 pivotally supported on the pivots 122 and carrying rollers 125 in rolling engagement with the shaft 109 previously mentioned.

The pipes 120 and 120ª are connected by preferably flexible tubes 126 with a pipe 126ª including a T-fitting from which a branch connection 127 provided with a conventional pressure check valve 130ª leads to an air pump 128 of suitable type having an air inlet 129 including a conventional suction check valve 130. The air pump 128, in the form shown, includes a piston or plunger 131 connected by means of a link 132 with an operating lever 133 pivoted at 134 upon a bracket 135 suitably mounted on the casing of the pump 128 as shown by dotted lines in Fig. 4. The lever 133 carries a roller 136 in rolling engagement with a cam 137 fixed upon the previously mentioned shaft 63, and whereby the plunger or piston 131 of the pump 128 is periodically operated to develop a gust of air for the purpose to be referred in detail further on in the description.

As shown in Fig. 2ª which with Fig. 2 illustrates a sectional elevation of the machine, a second hollow clamping roll 138 is located in operative relation to the first clamping roll 77, and is carried by a shaft 139 rotatably mounted in suitable bearings 140 on the frame 15 of the machine. The roll 138 comprises longitudinal members 141 and 141ª spaced apart approximately 90° and located in pairs in diametric registry with each other as shown in Fig. 2ª and fixed in place in any convenient manner as by screws 142 as illustrated in Fig. 1ª. The roll 138 further comprises arcuate peripheral plates 143 extending from one longitudinal edge of each member 141 and 141ª toward the next succeeding member 141ª and 141 respectively, and terminating at a distance therefrom to form peripheral slots 144 as illustrated in Fig. 2ª, said slots 144 extending lengthwise of said roll 138 for the purpose to be more fully referred to hereinafter. The members 141 and 141ª of the respective pairs are provided along one longitudinal edge with gripping members or gaskets 145 and 145ª respectively, of suitable material secured in position in any convenient manner so as to extend lengthwise of the associated slots 144. Cooperating pairs of gripping or clamping members 146 and 146ª are located within said roll 138 for respective cooperation with the gripping members or gaskets 145 and 145ª and preferably are grooved at their free ends as indicated at 147. The gripping or clamping members 146 and 146ª are secured respectively upon rock shafts 148 and 148ª conveniently mounted in the roll 138 and operatively controlled by any suitable means so as to adjust the grooved ends 147 of the members 146 and 146ª of each pair into and out of gripping or clamping relation with the gripping members or gaskets 145 and 145ª in inverse relation and in proper timing with the associated elements of the machine. For instance, as shown in Figs. 11 and 12 and by dotted lines in Fig. 2ª, the rock shafts 148 and 148ª are provided beyond one end of the roll 138 with arm 149 and 149ª respectively, said arms being on the respective rock shafts 148 and 148ª by bolts 150 as illustrated in Figs. 2ª and 6 and extending radially outward from the associated rock shafts 148 and 148ª. Toggle links 151 and 151ª are pivotally connected at 152 and 152ª respectively with the outer ends of the arms 149 and 149ª and at 153 and 153ª respectively, with bell-crank levers 154 and 154ª pivotally mounted at 155 and 155ª respectively within the roll 138 in any convenient manner. A member 156 has its opposite ends pivotally connected at 157 with the bell-crank levers 154 and is recessed at 158 to straddle the shaft 139, and a roller 159 is mounted at one end of each of the bell-crank levers 154 as shown in the drawings. A corresponding member 156ª is pivotally connected at 157ª with the bell-crank levers 154ª and is recessed at 158ª to straddle the shaft in transverse relation to the member 156. A roller 159ª corresponding to the roller 159 is mounted at one end of each of the bell-crank levers 154ª. The rollers 159 and 159ª are arranged to be acted on by a cam 160 carried by a shaft 161 journalled in bearings 162 on the frame 15 as illustrated in Figs. 6 and 6ª. For purposes of adjustment the cam 160 preferably is mounted upon a disk 160ª by means of slots and bolts 160ᵇ. The aforesaid arrangement is such that the gripping or clamping members 146 and 146ª are adjusted into and out of gripping relation with the gripping members or gaskets 145 in inverse relation in each cooperating pair and in predetermined sequence and association as will appear more fully hereinafter, to secure the desired operative results.

The clamping rolls 77 and 138 are geared together by means of gears 163 and 164 located respectively on the trunnion 79 and on the shaft 139 and connected by means of an intermediate gear 165, all as shown in Figs. 4, 5ª, and 6ª. The gear ratio is such that the clamping roll 77 will be given a half rotation for each quarter rotation of the clamping roll 138. The aforesaid clamping rolls 77 and 138 are intermittently actuated in steps by suitable mechanism (see Figs. 4, 5ª and 6ª) which, in the illustrated example, comprises an eccentric 166 mounted on the shaft 109 and including an eccentric ring 167 from which a member 168 projects radially outward and is pivotally connected at 169 with a rocking bracket 170 loosely mounted on the shaft 139 of the clamping roll 138. A lever 171 is adjustably fastened by means of a screw and slot 171ª to an associate lever 171ᵇ which is keyed or otherwise fixed on a stud 172 rotatably mounted on the bracket 170. The stud 172 also has rigidly connected therewith a member 173 movable into and out of notches 174 provided on the periphery of an operating disc 175 which is fixed upon said shaft 139. It will be noted that the operating disc 175 is provided with four notches 174 located approximately 90° apart on the periphery of said disc 175, as shown in Fig. 4. A toggle link 176 has its one end pivotally connected with the lever 171 and its opposite end pivotally connected with an arm 177 carried by stud 178 journalled in a bracket 179 suitably mounted on the frame 15. The stud 178 carries a second arm 180 which extends between opposed set screws 181 carried by a lever 182 which is loosely mounted on the stud 178 and at its free end is provided with a roller 183 which projects into the cam groove 184 on the cam 185 mounted on the previously mentioned shaft 161. A stop pawl 187 is fixed on the stud 178 to rock therewith. The clamping roller 77 is provided with a disc 188 fixed upon the trunnion 79 of said roll 77 and formed in its periphery with notches 189 located approximately 180° apart as shown in Fig. 4. A stop pawl 190 is arranged to cooperate with the notches 189 to maintain the clamping roll 77 in its successive positions of rest and is carried by an arm 191 pivoted at 192 and carrying a roller 193 at its free end in rolling engagement with the cam groove of a cam 194 fixed on the shaft 109.

With this arrangement the eccentric 166 as it is rotatably actuated will pivotally rock the bracket 170 and correspondingly actuate the lever 171. At the same time and in proper synchronism therewith the cam groove 184 in cooperation with the roller 183 will pivotally operate the lever 182 and with it the arms 180 and 177 to thereby swing the lever 171 on its pivot 172 and shift the projection 173 into and out of the notches 174. With the projection 173 in a notch 174 the operating disc 175 will be rotatably actuated through 90° and at the same time the clamping roll 77 will be rotatably operated to approximately 180° by the gearing 163, 164 and 165. As the projection 173 is moved into one notch 174, the stop pawl 187 will be removed from another notch 174 and vice versa so that said stop pawl 187 will enter a notch 174 to temporarily fix the clamping roll 138 in a position of rest. Coincidentally with these operations and in proper timing therewith the cam 194 in conjunction with the roller 193 will swing the lever 191 to move the stop pawl 190 into the notches 189 of the disc 188 to thereby alternately release and lock the clamping roll 77 as will be apparent from Fig. 4. As the eccentric 166 and the cams 185 and 194 are rotatively actuated, the associated arms and levers referred to hereinbefore will operate to produce a counterclockwise rotation of the clamping roll 138 extending over 90°, and a corresponding coincidental counterclockwise rotation of the clamping roll 77 extending over 180°, for each complete revolution of the shaft 109.

In cooperative relation with the clamping roll 138 the machine is provided with delivery means whereby successive beards a are advanced from the clamping roll 138 and combined with preceding beards a to form a continuous ribbon of fibers of varying thickness. In its illustrated form as shown in Figs. 13 and 14, the delivery means comprises a top roll 195 loosely mounted on a rock shaft 196 journalled in bearings 197 on the frame 15. The roll 195 carries ratchet wheels 198 and 199, the teeth of which face in opposite directions and cooperate with stop pawls 200 and 201 respectively, conveniently mounted in the machine and maintained in operative engagement with the respective ratchets by means of a spring 202. The ratchet wheel 199 preferably is removably fixed in place and is replaceable by other ratchet wheels having teeth of varying number and sizes whereby the thickness of the aforesaid ribbons of fibers may be varied at will in the manner more fully set forth hereinafter. The pawl 201 includes an integral member 203 arranged to ride on the surface of the clamping roller 138 which is provided at predetermined points with surface projections 204 acting successively on the member 203 in a manner to swing the pawl 201 out of engagement with the teeth of the ratchet 199, as illustrated in Fig. 2ª.

As shown in Figs. 13 and 14, members or arms 205 are fixed upon the shaft 196 by means of set screws 206 adjacent opposite ends of the top roll 195 and project radially from said shaft 196 as illustrated in Fig. 14. A guide roll 207 is carried by a shaft 207ª rotatably mounted in the members 205 and extends lengthwise of the top roll 195 in spaced parallel relation thereto as shown in Fig. 13, said guide roll 207 being in geared connection with the top roll 195 by means of gears 195ª and 207ᵇ (see Fig. 19) secured respectively to the top roll 195 and the shaft 207ª, and intermediate meshing pinions 195ᵇ and 207ᶜ rotatably mounted on one of the members 205 as shown in Fig. 13. The peripheral surface of the roll 195 is corrugated or grooved for cooperation with a corresponding corrugated or grooved bottom gripping roll 208 journalled in the hooked ends of rods 209 extending through and slidably mounted in the shaft 196 and members 205. The rods 209 are acted on by springs 210 in a manner to maintain the gripping roll 208 in engagement with the top roll 195. For the purpose of enabling the tension of the springs 210 to be adjusted, the ends of the rods 209 are screw-threaded for the reception of nuts 211 which serve as abutments for one of the ends of said springs 210. An arm 212 is fixed on the shaft 196 and is connected by means of a connecting rod 213 with the previously mentioned arm 177. A segmental plate 214 (see Fig. 2ª) is carried by shaft 215 suitably mounted in the machine in operative relation to the clamping roll 138 and to the delivery rolls 195 and 208. An inclined stationary table 216 is suitably mounted in the machine and converges toward its exit end 217, and at its opposite end includes a downwardly inclined apron 218 which projects beneath the roll 207. The exit or delivery end 217 of the table 216 is located in contiguous delivery relation to a tubular guide 219 located on and carried by an auxiliary frame 220 fixed on the main frame 15 and provided with cooperating rollers 221 and 222 carried respectively by a shaft 223 suitably journalled in the auxiliary frame 220 and a shaft 224 journalled in boxes 224ª slidably mounted in the auxiliary frame 220 and acted on by springs 224ᵇ to resiliently force the roller 222 toward the roller 221. The rollers 221 and 222 are located in associated relation with a discharge tube 225 located above a suitable removable receptacle 226. The rollers 221 and 222 are geared together by pinions 228 and are driven by means of a gear 229 fixed on the shaft 223 and meshing with a gear 230 fastened on the shaft 231 which is journalled in the auxiliary frame 220 as shown in Fig. 3. The shaft 231 carries a bevelled gear 232 meshing with an associated bevelled gear 233 fixed upon an upright shaft 234 rotatably mounted in a bearing 235 as illustrated in Fig. 2ª. At its lower end the shaft 234 carries a pinion 236 (see Fig. 4) which meshes with the teeth 237 of the rotatable table or support 238 on which the receptacle 226 is supported and whereby said receptacle 226 is rotated on its axis to coil the ribbon of fiber therein. The shaft 231 in addition carries a sprocket wheel 239 connected by means by means of a sprocket chain 240 with a sprocket wheel 241 fixed upon a shaft 242 rotatably mounted in bearings 243.

In addition to the parts so far described, the machine includes a revolving comber 244 (see Fig. 2ª) mounted on the shaft 161 in cooperative relation with the clamping roll 138, this revolving comber 244 being cleaned by means of a brush 245 fixed on a shaft 246 suitably journalled in brackets 246ª fixed on the frame 15. The brush 245 is located in operative relation to another brush 247, preferably a steel brush, carried by a shaft 248, and itself subject to cleaning by a cleaning device 249 carried by a rock shaft 250 rotatably mounted in brackets 251 and rocked by means of an arm 252. The latter is connected with and operated by a bar 253 which in turn, as shown in Fig. 2ª, is connected with the band 254 of an eccentric 255 suitably mounted on one of the brackets 246ª and operatively connected with the shaft 246 by a gear 246ᵇ and a pinion 255ª as shown in Fig. 6.

As shown diagrammatically in Fig. 19, power is transmitted from the driven shaft 109 by means of a gear 256 meshing with a gear 257 on the shaft 63 and a gear 258 on the shaft 161. The operation of the shaft 63 results in an operation of the cams 61 which in turn bring about the previously mentioned reciprocation of the feeding table 35 and its associated elements in the manner more fully set forth hereinafter. In addition the rotation of the shaft 63 operates the cams 72 which bring about and control the operation of the combs 63ª, 64 and 65, see Fig. 2.

At the same time, the driven shaft 109 itself operates the cams 102 and 107 and through the latter the cam slides 87 which in turn control the operation of the clamping members 82 of the clamping roll 77 as previously described herein. The driven shaft 109 simultaneously with the above also operates the eccentric 166 and its associated linkage illustrated in Fig. 4 to concurrently produce a 90° counterclockwise rotation of the clamping roll 138, and a 180° counterclockwise rotation of the clamping roll 77 as will be pointed out in more detail further on in the specification.

As the shaft 161 is operated, it will correspondingly actuate the cam 160 whereby the operation of the clamping members 146 and 146ª of the clamping roll 138 is controlled as described more fully hereinafter. The shaft 161, by means of a train of gearing 161ª, further operates the shaft 246 and brush 245 carried thereby, and by means of gear 246ᵇ and 255ª (see Fig. 6) operates the eccentric 255 which in turn actuates the cleaning device 249 illustrated in Fig. 2ª.

A train of gearing 259 transmits motion from the shaft 161 to the shaft 242 and by means of the sprocket chain 240 and sprocket wheels 241 and 239 to the shaft 231 whereby the rollers 221 and 222 are operated. At the same time a sprocket chain 260 and sprocket wheels 261 and 262 transmit motion to gears 264 and steel brush 247.

As the shaft 63 is rotated, the bell-crank levers 56 (see Fig. 2) will be rocked by the action of the cam groove 61 on the roller 60 to thereby rock the levers 40 and thus to cause the feeding table 35 to be reciprocated, said feeding table 35 being movably supported by the rollers 36 which travel on the horizontal tracks 37. In Fig. 2 the feeding table 35 and its associated elements are approaching the end of its movement toward the clamping roller 77 with the rollers 53 riding up on the cams 55 to thereby finally swing the arms 52 to an elevated position and raise the pins 51 from the apertures 46 and 47 to release the fibers as will be more fully explained hereinafter. As the feeding table 35 moves in the opposite direction toward the left in Fig. 2, it will finally engage the depending member 31 of the lever 29 to swing the latter on the shaft 19. This actuation of the lever 29 will cause the pawl 27 in cooperation with the ratchet wheel 26 to rotate the feeding rollers 17, 21 and 16 in a direction to advance the fiber.

To facilitate the understanding of the operation of the apparatus, it may be stated that it includes four cycles shown diagrammatically in Figs. 15, 16, 17, and 18, respectively.

*Fig. 15, cycle 1.*—Introduction of lap into open clamp of the roll 77.

Blowing free end of a beard held by clamp of the roll 77 into the open clamp 146 of the roll 138.

Start of combing of short end of a beard by rotary comb 244.

Gripping short end of combed beard by delivery roll 195 and gripping roll 208.

*Fig. 16, cycle 2.*—Return motion of table 35 in in order to detach beard from lap, and combing the long end of said beard by comb 63ª and feeding of lap.

Finish combing the short end of beard by comb 244.

Start of delivering combed beard by delivery roll 195 and gripping roll 208.

*Fig. 17, cycle 3.*—Detaching beard from lap and combing long end of beard by comb 63ª, 64, and 65.

Delivery of combed beard by delivery roll 195 and gripping roll 208. Removal of the long end of combed beard from the clamp of the roll 138.

*Fig. 18, cycle 4.*—Lap approaching clamp of roll 77.

Start of blowing the free end of the beard held by the clamp of roll 77 into the open clamp of roll 138.

In practice the fiber in the form of a sliver A coming, for instance, from a conventional drawing frame, is intermittently advanced by the rollers 16, 21 and 17 and from said rollers passes to the feeding table 35 and into and through the passage 44 thereof. As previously stated herein the fiber, instead of being fed in the form of a sliver, may be fed as a ribbon from a roll thereof, supported on the feed rollers 16 and 17, to the feeding table 35 and through the passage 44 thereof. In either case, after having been fed forwardly by the operation of the table 35, the projecting portion of the sliver or ribbon at the forward end of the table 35 will pass into the space between one of the gripping members 81 and its associated clamping member 82 which is in its open position at the time as illustrated in Fig. 2 and diagrammatically in Fig. 15. The rollers 53 having passed upwardly on the cams 55, the pins 51 will have been lifted from the apertures 46 and 47 as diagrammatically illustrated in Fig. 15. At the proper moment the cam 107 by acting on the roller 106 will rock the lever 103 on its pivot 104 in a direction to cause its upper end to exert a pressure toward the left in Fig. 5ª on the abutment 96 and to thereby shift the one cam slide 87 in the same direction. The associated roller 86 (see Fig. 1) will thereby pass out of the cam recess 89 and ride up on the cooperating cam projection 90 of said one cam slide 87. The aforesaid shifting of the roller 86 from the recess 89 to the projection 90 will, by means of the associated arm 85 (see Fig. 2), rock the shaft 84 on its axis in a direction to move the clamping member 82 toward and into engagement with its associated gripping member 81 to thereby clamp the end of the sliver or ribbon securely on the first clamping roller 77. As the latter is rotated in the direction of the arrow in Fig. 15, the feeding table 35 will begin its movement toward the left as shown diagrammatically in Fig. 16, and the pins 51 will be lowered into the apertures 46 and 47 because of the fact that the rollers 53 move downwardly on the cams 55. The sliver or ribbon is thereby again gripped and connected with the feeding table 35. At the same time, the combs 63ᵃ, 64 and 65 are moved upwardly by the cams 72 and associated elements into the operative positions illustrated diagrammatically in Fig. 17. Thus as the roller 77 continues its rotation in the direction of the arrow in Fig. 15, the sliver or ribbon will be drawn through the combs 63ᵃ, 64 and 65, which combs serve to separate the fibers and hold back the pulp chips which may be present in that part of the sliver which is not held by the clamping member 82 and gripping member 81. As the feeding table 35 is coincidentally moving toward the left and as the sliver or ribbon is clamped on said table by the action of the pins 51, the sliver or ribbon will be subjected to a pulling force which finally will bring about a tearing apart thereof to provide a separate element which for convenience may be termed a beard a as shown diagrammatically in Fig. 18. The rotation of the roller 77 is continued through an arc of approximately 180° which brings the gripped end of the beard a into registry with one of the slots 144 and the space between one of the gripping members 145 or 145ᵃ and its associated clamping member 146 and 146ᵃ which at the time occupies its open position as shown in Fig. 2ᵃ and diagrammatically in Fig. 18. In proper timing with these operative steps the piston or plunger 131 (Fig. 4) of the pump 128 is forced downwardly therein to propel a gust of air through the check valve 130ᵃ, pipe 127, T fitting 127ᵃ (Fig. 5), which T splits such gust of air into two equal halves. One half of such gust of air flows through the pipe 126ᵃ, flexible tube 126, pipe 120, the upper outlet of which, at this time, is in registry with the inlet passage 119, located at the extreme end of nozzle member 117 (Fig. 10). The other half of said gust of air flows through pipe 126ᵇ (Fig. 5ᵃ), flexible tube 126ᶜ, pipe 120ᵃ, which, at this stage, is in registry with the corresponding inlet passage 119ᵇ at the other end of nozzle chamber 117 (Fig. 10). The gust of air is, therefore, forced from both ends into the roll 77 or, more precisely, into the air channel 118, located below and running throughout the entire length of clamping member 82. From here, the air escapes outwardly through the air-nozzles 119ᵃ, consisting of a series of small, closely-spaced drill holes, extending throughout the entire length of the clamping member 82. The drill holes are small in diameter and of sufficient length to impart to the escaping air the character of strong and directed jets pointing toward the slot 144 (Fig. 15). The beard a (Fig. 18), clamped at one end by the clamping member 82 has its other end hanging freely, as soon as this latter end is completely drawn through the combs 63ᵃ, 64, and 65. (One step later than the one as shown diagrammatically in Fig. 18). The strong and directed gusts of air escaping, at this moment, under the free hanging beard in close proximity to its clamping point raises the beard and blows it into the slot 144 and into the space between the clamping member 146 or 146ᵃ and its associated gripping member 145 or 145ᵃ into the interior of the second clamping roll 138 as shown diagrammatically in Fig. 15. At the proper moment, the cam 102 as shown in Fig. 5, by acting on the roller 101 will rock the operating lever 98 on its pivot 99 in a manner to cause its upper end to develop a pushing force on the abutment 95 of the one cam slide 87. The latter will thereby be shifted to the right in Fig. 5 or downwardly in Fig. 1 and the particular roller 86 will shift from the cam projection 90 back into the associated cam recess 89 of said cam slide 87. As a result, the roller 86 through the medium of its arm 85 shown in Fig. 2, will rock the one shaft 84 on its axis in a manner to move the particular clamping member 82 of the roll 77 away from its associated gripping member 81 to thereby release the previously clamped end of the beard a from the roll 77. At the same time, the cam 160 by acting on either the roller 159 or 159ᵃ will operate the associated previously described system of arms and levers in a manner to cause the particular clamping member 146 or 146ᵃ of the roll 138 to be shifted toward and into engagement with its associated gripping member 145 or 145ᵃ as the case may be to securely clamp the beard a in connection with the second clamping roll 138. At the same time the aforesaid operation of the given system of arms and levers will shift the other clamping member 146 or 146ᵃ of either pair away from its cooperating gripping member 145 or 145ᵃ to an open position to release a beard a which may have been clamped thereby. In any case, the roll 138 will be rotated through the arc of approximately 90° to permit the comb 244 which in the meantime is being operated, to comb, clean and remove the short fibers from the relatively short projecting portion of the beard a which previously had been inaccessible because of being clamped on the roll 77 and accordingly had not been acted upon by the combs 63ᵃ, 64 and 65. When this last-mentioned combing operation has been completed, the roll 138 is rotated again through an arc of approximately 90° at which time the segmental plate 214 engages the projecting portion of the beard a to thereby force the same upwardly into operative relation with the delivery roller 195 and gripping roll 208, Fig. 2ᵃ. At this stage, shown in Fig. 15 and designated as cycle 1, the gripping roll 208 will be rocked in a clockwise direction as shown by the arrow in Fig. 15 around the rockshaft 196, while the delivery roll 195, loosely mounted on said rockshaft 196, is held against movement in this direction by the engagement of the pawl 200, Fig. 2ᵃ, with the ratchet 198 rigidly connected with the delivery roll 195. The corrugated surface of the gripping roll 208 engaged in the corrugated surface of the delivery roll 195, causes rotation of the gripping roll 208 in a clockwise direction, thereby rolling over and upon the beard a, which previously has been brought close to the delivery roll 195 by the action of the segmental plate 214. The rocking motion in a clockwise direction of the gripping roll 208 reverses itself into a rocking motion in a counterclockwise direction, as soon as the gripping roll reaches the immediate proximity of the clamping roll 138, shown in Fig. 16 and designated as cycle 2. Because of the fact that the corrugated gripping roll 208, Fig. 2ᵃ, is pressed toward the corrugated delivery roll 195 by the springs 210, both rolls will swing as a unit without moving relatively to each other in this direction. As a result, the beard a, which is gripped between the rolls 195 and 208, will be partially withdrawn from the roll 138, it being understood that the clamping member 146 previously has been shifted away from its associated gripping member 145 to permit the beard to be withdrawn. At this stage, the clamping roll 138 starts its counterclockwise rotation, as shown in Fig. 17, designated as cycle 3, thereby releasing the pawl 201, Fig. 2ᵃ, which previously had been kept out of engagement with the ratchet 199 by one of the projections 204 on the roll 138. The tooth length of such ratchet 199 is so dimensioned that after a predetermined rocking arc, the delivery roll 195 and with it the withdrawal of the beard a are stopped by contact of the pawl 201 with a tooth of the ratchet 199. The rocking motion, however, continues until the end of the stroke of the lever 213, Fig. 4 and Fig. 18, designated as cycle 4. The arrested delivery roll 195, Fig. 2ª, causes the gripping roll 208 to rotate in a counterclockwise or a non-delivery direction.

The number of teeth of the ratchet 199 determines the extent to which the clamped beard a is withdrawn—i. e., the weight of the delivered sliver as more fully described below.

In the meantime, the other end of the beard a has been withdrawn from the open clamp, by the rotation of the clamping roll 138 in a counterclockwise direction, and lays upon the peripheral plate 143, as shown in Fig. 18 designated as cycle 4.

At this stage, the shaft 196, Fig. 2ª, will again be rocked in a clockwise direction. Fig. 15 is designated as cycle 1, and the operation repeats itself as described above. The rotation of the clamping roll 138, Fig. 2ª, has, in the meantime, brought the next successive beard a into operative relation to the feed rollers.

The function of the guide roll 207, Fig. 2ª, is to support the delivered beard a. The motion of such guide roll 207 is identical to the motion of the gripping roll 208, the rotating motion being imparted by gears 195ª, 195ᵇ, 207ᶜ, and 207ᵇ, Fig. 13. The delivery mechanism is illustrated in Figs. 1ª, 2ª, 4, 7, 13, 14, 15, 16, 17, and 18.

The aforesaid operations are repeated in the operative cycle to withdraw successive beards a from the clamping roller 138 and combine the same in overlapping relation in the form of a continuous ribbon b of fibers which passes to the table 216 and down the same to the tubular guide 219 and rollers 221 and 222.

The successive beards a are overlapped to an extent corresponding to the rotative distance travelled by the roller 195 until a tooth of the ratchet 199 contacts the pawl 201 in its operative position. The size or number of the teeth of said ratchet 199 in cooperation with the pawl 201 accordingly predetermine the extent to which the successive beards a overlap each other and thereby predetermine the thickness of the continuous ribbon. In other words, relatively large teeth in small numbers on the ratchet 199 result in a relatively thin continuous ribbon while a large number of small teeth result in a thicker continuous ribbon. In any case, as the ribbon passes through the tubular guide 219, it is formed into a continuous sliver by the action of the guide 219 and is gripped by the rollers 221 and 222 and fed through the discharge tube 225 into the receptacle 226. As the latter is rotated on its axis during these operations, the continuous sliver will be coiled upon itself in said receptacle 226.

It will be understood as the operation of the machine continues, that successive beards similar to the beard a will be produced and acted on by the mechanism as described and as diagrammatically illustrated in Figs. 15 to 18 inclusive, and that these successive beards are combined to form an uninterrupted and uniform sliver of fibers which is delivered continuously to the receptacle 226 and may be removed therefrom at will for further treatment as may be desired.

The novel machine is designed primarily for combing textile fabrics and is particularly adapted for combing fibers of wool, flax, hemp, silk-waste, etc., having a length sufficient to enable the machine to efficiently perform its functions thereon. The fibers, for convenience may be referred to as of "medium length" with the understanding that this term includes all but very short fibers.

To properly accommodate fibers of varying length, as shown diagrammatically in Figs. 15 to 19 inclusive, clamping rolls of different diameters may be provided or the spacing of the gripping or the clamping members thereon may be varied.

Although the present invention has been described in conjunction with a preferred embodiment, it is to be understood that modifications and variations may be resorted to without departing from the spirit and scope of the invention, as those skilled in the art will readily understand. Such variations and modifications are considered to be within the purview and scope of the claims.

I claim:

1. In a comber of the kind described, a reciprocable feeding table provided with a plurality of apertures, a fixed plate carried by said table in spaced parallel relation to its one surface to form a passage for the accommodation of a fibrous ribbon, said plate being provided with apertures in registry with the apertures of said table, a movable holding plate, a plurality of pins carried by said holding plate and arranged to extend through and into said apertures across said passage to connect said fibrous ribbon with said feeding table, an arm pivotally mounted on said table and carrying said holding plate, a roller on said arm, a stationary cam located in the path of said roller and co-operating therewith as said table is reciprocated to pivotally actuate said arm whereby said holding plate is shifted to remove said pins from said apertures whereby said ribbon is disconnected from said table, means for reciprocating said feeding table whereby said ribbon is advanced and said table is moved relatively to said ribbon in an operative cycle, and means for clamping said ribbon during relative movement of said table thereto.

2. In a comber of the kind described, a reciprocable feeding table provided with a plurality of apertures, a fixed plate carried by said table in spaced parallel relation to its one surface to form a passage for the accommodation of a fibrous sliver, said plate being provided with apertures in registry with the apertures of said table, a movable holding plate, a plurality of pins carried by said holding plate and arranged to extend through and into said apertures across said passage to connect said fibrous sliver with said feeding table, an arm pivotally mounted on said table and carrying said holding plate, a roller on said arm, a stationary cam located in the path of said roller and co-operating therewith as said table is reciprocated to pivotally actuate said arm whereby said holding plate is shifted to remove said pins from said apertures whereby said sliver is disconnected from said table, means for reciprocating said feeding table whereby said sliver is advanced and said table is moved relatively to said sliver in an operative cycle, a plurality of rods pivotally mounted on said table, combs carried by said rods, means for operating said arms to move said combs into operative relation with the delivery end of said table, and means for separating a fibrous beard from said fibrous sliver and drawing said beard through said combs to comb the same.

3. In a comber of the kind described, the combination of means for gripping and intermittently feeding fibrous ribbons, a hollow clamping roll located in receiving relation to said feeding means and provided with diametrically opposite peripheral openings, pivoted clamping members within said roll effective in said peripheral openings to clamp the advance ends of said ribbons in connection with said roll, cam slides within said roll operatively associated with said clamping members and extending outwardly beyond said roll, means located exteriorly of said roll for slidably operating said cam slides to pivotally adjust said clamping members to respective clamping and releasing positions in inverse relation, and means for rotatively operating said roll to thereby tear fibrous beards from said ribbons and advance said beards for release from said roll.

4. In a comber of the kind described, the combination of means for gripping and intermittently feeding fibrous slivers, a hollow clamping roll located in receiving relation to said feeding means and provided with diametrically opposite peripheral openings, pivoted clamping members within said roll effective in said peripheral openings to clamp the advance ends of said slivers in connection with said roll, cam slides within said roll operatively associated with said clamping members and extending outwardly beyond said roll, operating means located exteriorly of said roll in independent relation thereto, said cam slides being movable with said roll into periodic operative relation to said operating means for slidable operation thereby to pivotally adjust said clamping members to respective clamping and releasing positions in inverse relation, means for rotatively operating said roll to thereby tear fibrous beards from said slivers and advance said beards for release from said roll, and combing means located between said gripping and feeding means and said roll for combing said fibrous beards.

5. In a comber of the kind described a combination of a first and second clamping roll, first and second clamping means within said rolls respectively, pneumatic means in associate relation to the clamping means for delivering a gust of air throughout the entire length of said clamping means directed from within the first clamping roll and below said first clamping means into the second clamping means whereby the free hanging portion of the beard is lifted and transferred into the second clamping means while the other end of said beard is still clamped by the first clamping means.

6. In a comber of the kind described the combination of first and second clamping rolls, first and second clamping means within said rolls respectively, an air pump synchronized with the operative steps to produce a gust of air, pipes and flexible tubes for conveying such gust of air into the first clamping roll, an air-channel within the first clamping roll, inlet passages, and a series of air nozzles directly below and throughout the length of the clamping means and directed towards the second hollow clamping roll.

7. In a comber of the kind described, the combination of means for intermittently advancing individual fibrous beards in succession, a clamping roll for receiving successive individual fibrous beards and continuing the intermittent advance thereof to a point of disconnection from said clamping roll, actuating means for intermittently operating said roll, combing means for combing said individual beards, a rock shaft journalled in associated relation with said clamping roll, a corrugated top roll loosely mounted on said rock shaft, a pair of ratchet wheels carried by said top roll and having teeth facing in opposite directions, oppositely acting stop pawls co-operating individually with the respective ratchet wheels to arrest movement of each of said ratchet wheels in one direction, a releasing member carried by one of said stop pawls and arranged to ride on the surface of said clamping roll, surface projections located at spaced intervals on said clamping roll for actuating said releasing member to adjust said one of said stop pawls to an inoperative position, members fixed on said rock shaft and projecting radially therefrom adjacent to opposite ends of said top roll, a guide roll rotatably mounted in said members in spaced parallel relation to said top roll, rods carried by said members and extending diametrically through said rock shaft, a corrugated gripping roll journalled in said rods in parallel relation to said top roll, springs acting on said rods to maintain said gripping roll in gripping engagement with said top roll to grip the individual beards, and means connected with the actuating means for said clamping roll for rocking said rock shaft on its axis whereby said top roll is correspondingly rocked in one direction coincidentally with the release of said one pawl by the action of one of the surface projections of the clamping roll on said releasing member, and said gripping roll is simultaneously swung on the axis of said rock shaft in gripping engagement with said top roll to detach a given beard from said clamping roll, and whereby said gripping roll is subsequently swung in a return direction on the axis of said rock shaft relatively to said top roll and to the previously gripped beard to thereby combine successive beards in overlapping relation to form a continuous fibrous ribbon, said rocking of the rock shaft further operating said guide roll to feed said continuous fibrous ribbon in successive steps.

ARTHUR JOB.